(No Model.)

W. PARKER.
SPINDLE FOR FORMING TUBES OF VENEERING.

No. 368,606. Patented Aug. 23, 1887.

Witnesses.
S. N. Piper.
R. B. Torrey

Inventor.
William Parker.
by R. H. Eddy atty.

United States Patent Office.

WILLIAM PARKER, OF CAMBRIDGEPORT, MASSACHUSETTS.

SPINDLE FOR FORMING TUBES OF VENEERING.

SPECIFICATION forming part of Letters Patent No. 368,606, dated August 23, 1887.

Application filed March 23, 1887. Serial No. 232,088. (No model.)

*To all whom it may concern:*

Be it known that I, WILLIAM PARKER, of Cambridgeport, in the county of Middlesex, of the Commonwealth of Massachusetts, have invented a new and useful Improvement in Spindles for Forming Tubes of Veneering; and I do hereby declare the same to be described in the following specification and represented in the accompanying drawings, of which—

Figure 1:
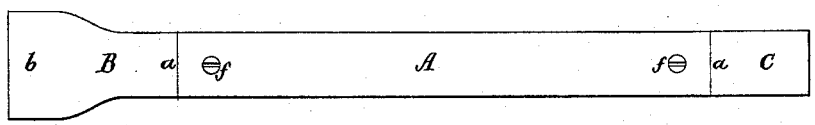
Figure 2:
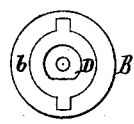
Figure 3:
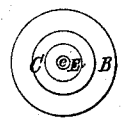
Figure 4:
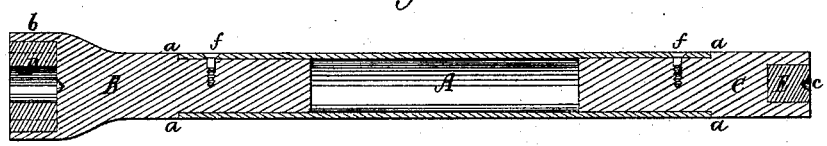
Figure 5:
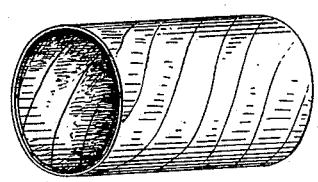
Figure 6:
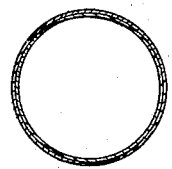

Figure 1 is a side elevation; Figs. 2 and 3, opposite end views; and Fig. 4, a longitudinal and median section of a spindle of my invention, the nature of which is defined in the claim hereinafter presented. Fig. 5 is an enlarged perspective view of the finished article. Fig. 6 is a cross section of the product.

In such drawings, A is a metallic tube having inserted in each end of it up to a shoulder a wooden plug, such plugs being shown at B and C and their shoulders at $a$. The external surface of each plug at the shoulder has a diameter equal to that of the tube. The plug B has an enlargement or head, $b$, into which there is inserted endwise of it a metallic dog, D, formed as shown, such dog being to hold the spindle in the center of a lathe-arbor.

A metallic center or cylinder, E, having a conical recess, $c$, at the central part of its outer end, is inserted and fixed in the plug C at its outer extremity, concentric with such plug, which, with the headed plug, is held in connection with the metallic tube by screws $f$.

In using the spindle so constructed it is to be placed in a lathe with the center-pin of the arbor of the head-stock thereof inserted in the dog and flattened on one side to fit the dog in a manner to cause the spindle to revolve with the said arbor when it may be in revolution, the arbor of the tail-stock of the lathe being at the time introduced at its conical end into the recess $c$. This having been done, a strip of veneering is to be laid on the spindle somewhat obliquely thereto, and such strip lapping on the wooden plug B is to be secured thereto by one or more tacks driven through the strip and into the plug. The strip is drawn tightly lengthwise and spirally around the spindle to be used, the latter revolving with the edges of each next two adjacent coils in contact until the strip may lap on the plug C, to which the lapping part is to be secured by one or more tacks driven through it into the plug. Next the outer surface of the strip of veneering so laid on the spindle is to be coated with glue, or the inner surface of another such strip may be similarly coated. The second strip is next to be applied to the spindle, and to be tacked at one end to one of its plugs, after which the spindle is to be revolved so as to cause the strip to be laid in a spiral on it and the front strip, the coils running either in the same or in the opposite direction relatively to those of the first strip and covering the joints thereof. After the tube may have been so made and its glued surfaces may have become dry it may be drawn off the spindle.

Without the wooden plugs it would be difficult, if not impossible, to secure the ends of the strips to the spindle, and without the metallic body or tube the tube, after its formation, could not easily be drawn off the spindle. So without the metallic dog and center arranged in the opposite plugs the spindle composed in part of wooden plugs would soon wear its ends so as to run untrue, great strain being brought on it laterally in coiling the strips.

I claim—

The spindle, substantially as described, composed of the metallic tube, the wooden plugs inserted in and projecting from and fastened to it, as represented, and the metallic dog and center, as shown, fixed in the said plugs, all being essentially and for use as set forth.

WILLIAM PARKER.

Witnesses:
R. H. EDDY,
R. B. TORREY.